United States Patent
Miyake

(10) Patent No.: US 9,565,328 B2
(45) Date of Patent: Feb. 7, 2017

(54) MULTI-FUNCTIONAL DEVICE AND STORAGE MEDIUM

(71) Applicant: Brother Kogyo Kabushiki Kaisha, Nagoya-shi, Aichi-ken (JP)

(72) Inventor: Takeshi Miyake, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/082,322

(22) Filed: Mar. 28, 2016

(65) Prior Publication Data

US 2016/0295057 A1 Oct. 6, 2016

(30) Foreign Application Priority Data

Mar. 30, 2015 (JP) ................................. 2015-068697

(51) Int. Cl.

| H04N 1/00 | (2006.01) |
|---|---|
| G06F 3/12 | (2006.01) |
| H04L 29/08 | (2006.01) |
| H04N 1/32 | (2006.01) |

(52) U.S. Cl.
CPC .......... *H04N 1/00925* (2013.01); *H04L 67/02* (2013.01); *H04N 1/32502* (2013.01); *H04N 2201/0094* (2013.01)

(58) Field of Classification Search
None
See application file for complete search history.

(56) References Cited

U.S. PATENT DOCUMENTS

| 2005/0129245 | A1 | 6/2005 | Takaoka |
|---|---|---|---|
| 2005/0216514 | A1* | 9/2005 | Murata ................. G03G 21/02 |
| 2006/0026434 | A1* | 2/2006 | Yoshida ................ G06F 21/608 |
| | | | 713/182 |
| 2007/0005980 | A1 | 1/2007 | Miyazawa |
| 2007/0234400 | A1* | 10/2007 | Yanagi .................. G06F 21/608 |
| | | | 726/1 |
| 2015/0172267 | A1* | 6/2015 | Sato ...................... H04L 63/102 |
| | | | 726/3 |

FOREIGN PATENT DOCUMENTS

JP 2005-167957 A 6/2005

* cited by examiner

*Primary Examiner* — Thomas D Lee
(74) *Attorney, Agent, or Firm* — Banner & Witcoff, Ltd.

(57) ABSTRACT

A multi-functional device configured to receive a function execution request transmitted from a terminal device without using a driver program, transmit a relation information request for requesting transmission of user relation information to the terminal apparatus, in a case where the function execution request not including individual relation information relating to individual identification information is received from the terminal apparatus, and control a specific function engine of the multi-functional device to execute a specific function, in a case where the function execution request including individual relation information relating to individual identification information is received from the terminal apparatus in response to the transmitting of the relation information request to the terminal apparatus and on condition that individual permission information associated with the individual identification information in a table indicates that use of the specific function is permitted.

10 Claims, 7 Drawing Sheets

MULTI-FUNCTIONAL DEVICE AND STORAGE MEDIUM

CROSS-REFERENCE TO RELATED APPLICATIONS

This application claims priority from Japanese Patent Application No. 2015-068697 filed on Mar. 30, 2015, the entire contents of which are incorporated herein by reference.

TECHNICAL FIELD

The disclosure relates to a multi-functional device configured to execute a plurality of functions.

BACKGROUND

Regarding a multi-functional device configured to execute a plurality of functions including a printing function, a scan function, a facsimile function and the like, a technology for limiting a function that can be used by each user has been known. For example, a related-art network facsimile apparatus changes a function that can be used by an operation user between a case where the operation user operating the apparatus is a registered user and where the operation user is a general user who is different from the registered user.

SUMMARY

The disclosure is to provide a technology with which a multi-functional device can appropriately limit a function in accordance with a function execution request.

According to an aspect of the disclosure, there is provided a multi-functional device configured to execute a plurality of functions, the multi-functional device including: a specific function engine configured to execute a specific function of the plurality of functions; a processor; and a memory configured to store therein a table, which includes a plurality of user information including one or more individual user information and one general user information, and instructions, wherein each individual user information is information in which individual identification information for identifying an individual user and individual permission information indicating whether the individual user is permitted to use each of the plurality of functions are associated with each other, wherein the general user information includes general permission information indicating whether each user who is different from the individual user is permitted to use each of the plurality of functions, and wherein the instructions, when executed by the processor, cause the multi-functional device to perform: receiving a first function execution request from a first terminal apparatus, in a case where the first terminal apparatus having a driver program for the multi-functional device transmits the first function execution request for requesting the multi-functional device to execute the specific function to the multi-functional device by using the driver program; controlling the specific function engine to execute the specific function, in a case where the first function execution request including first individual relation information relating to first individual identification information is received from the first terminal apparatus and on condition that first individual permission information associated with the first individual identification information in the table indicates that use of the specific function is permitted; controlling the specific function engine to execute the specific function, in a case where the first function execution request not including the individual relation information relating to the individual identification information is received from the first terminal apparatus and on condition that the general permission information in the table indicates that use of the specific function is permitted; receiving a second function execution request from a second terminal apparatus, in a case where the second terminal apparatus transmits the second function execution request for requesting the multi-functional device to execute the specific function to the multi-functional device without using the driver program, wherein the second apparatus is the same as or different from the first terminal apparatus; transmitting a relation information request for requesting transmission of user relation information to the second terminal apparatus, in a case where the second function execution request not including the individual relation information relating to the individual identification information is received from the second terminal apparatus; and controlling the specific function engine to execute the specific function, in a case where the second function execution request including second individual relation information relating to second individual identification information is received from the second terminal apparatus in response to the transmitting of the relation information request to the second terminal apparatus and on condition that second individual permission information associated with the second individual identification information in the table indicates that use of the specific function is permitted.

According to the above configuration, the memory of the multi-functional device is configured to store therein the table including the individual user information and the general user information. The multi-functional device receives the first function execution request transmitted from the first terminal apparatus by using the driver program. In this case, (1) in a case where the first function execution request includes the first individual relation information, the multi-functional device permits or limits the using of the specific function in accordance with the first individual permission information in the table, and (2) in a case where the first function execution request does not include the individual relation information, the multi-functional device permits or limits the using of the specific function in accordance with the general user information in the table. Also, the multi-functional device receives the second function execution request transmitted by the second terminal apparatus without using the driver program. The first time second function execution request that is transmitted from second terminal apparatus to the multi-functional device does not include the individual relation information. Therefore, the multi-functional device transmits the relation information request to the second terminal apparatus and receives the second time second function execution request including the second individual relation information. The multi-functional device is configured to permit or limit the using of the specific function in accordance with the second individual permission information in the table. Thereby, even if the general permission information indicates that the use of the specific function is not permitted, in a case where the second individual permission information indicates that the use of the specific function is permitted, the multi-functional device can execute the specific function in accordance with the second function execution request. In this way, the multi-functional device can appropriately limit the function in accordance with each of the first function execution request conforming to the driver program and the second function execution request not conforming to the driver program.

A control method for implementing the multi-functional device, a computer program, and a computer-readable recording medium having the computer program stored therein are also novel and useful. Also, a communication system including the multi-functional device and the one or more terminal apparatuses are novel and useful.

Figure 1:
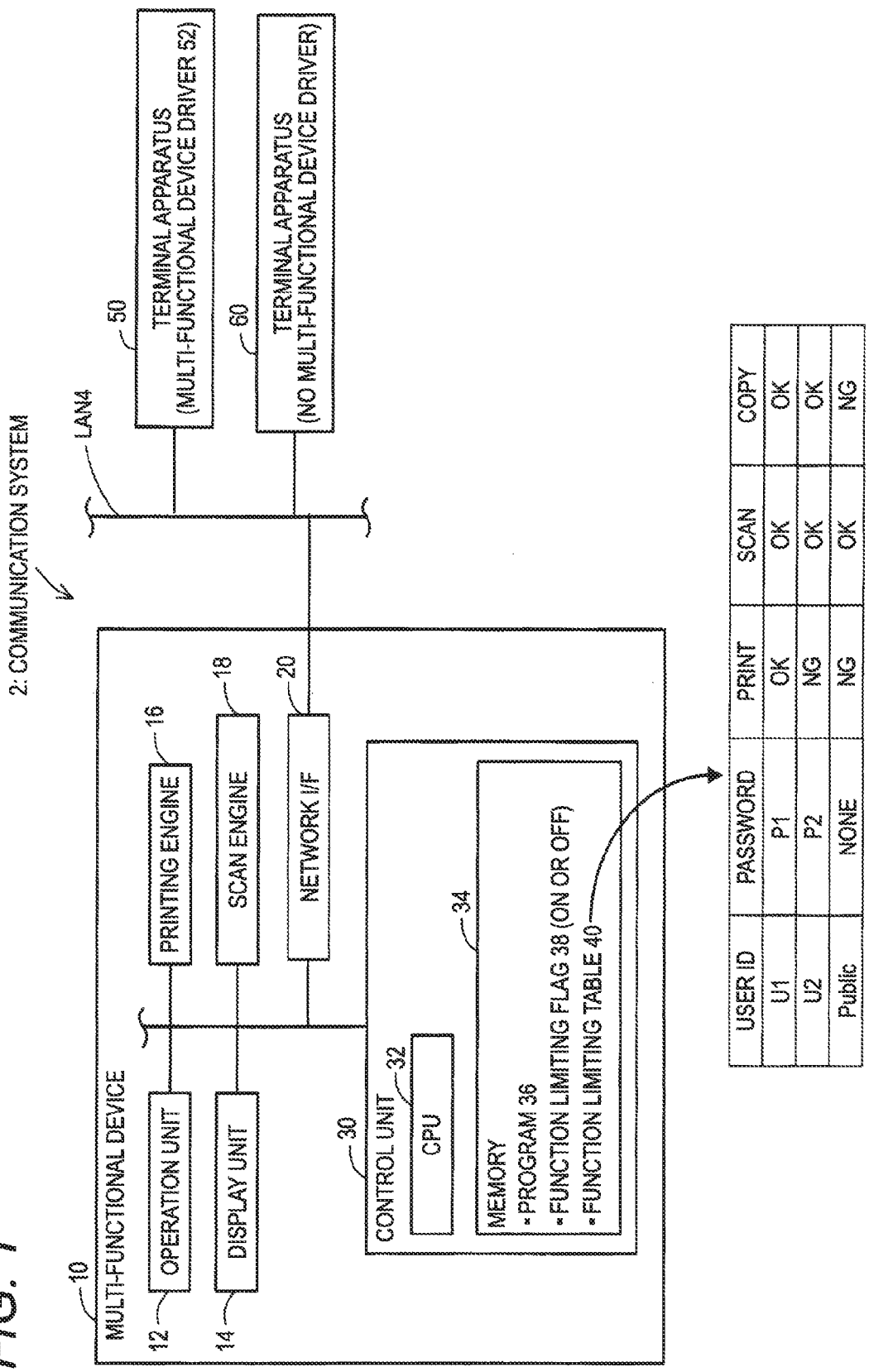
FIG. 1 shows a configuration of a communication system.

DETAILED DESCRIPTION (Configuration of Communication System 2; FIG. 1)

As shown in FIG. 1, a communication system 2 includes a multi-functional device 10 and a plurality of terminal apparatuses 50, 60. The respective devices 10, 50, 60 can perform communication with each other through a Local Area Network (LAN) 4.

(Configuration of Multi-Functional Device 10)

The multi-functional device 10 is a peripheral apparatus (i.e., a peripheral apparatus of the terminal apparatus 50 and the like) capable of executing a plurality of functions including a printing function, a scan function, a copy function and the like. The multi-functional device 10 has an operation unit 12, a display unit 14, a printing engine 16, a scan engine 18, a network interface 20 and a control unit 30. The respective units 12 to 30 are connected to a bus line (a reference numeral thereof is omitted). In the meantime, the interface is hereinafter referred to as 'I/F.'

The operation unit 12 has a plurality of keys. A user can input a variety of instructions into the multi-functional device 10 by operating the operation unit 12. The display unit 14 is a display for displaying a variety of information. The display unit 14 is configured to function as a so-called touch panel. That is, the display unit 14 is further configured to function as the operation unit to be operated by the user. The printing engine 16 has a printing mechanism of an inkjet mode or a laser mode, for example. The scan engine 18 has a scan mechanism of a Charge Coupled Device (CCD), a Contact Image Sensor (CIS) and the like. The network I/F 20 is an interface for performing wired communication or wireless communication, and is connected to the LAN 4.

The control unit 30 has a CPU 32 and a memory 34. The CPU 32 is configured to execute a variety of processing, in response to a program 36 stored in the memory 34. The memory 34 is configured by a volatile memory, a non-volatile memory and the like. In addition to the program 36, the memory 34 is configured to store therein a function limiting flag 38 and a function limiting table 40. The function limiting flag 38 indicates any one value of 'ON', which means that a function limit corresponding to each user is to be executed (i.e., the function limiting table 40 is to be used), and 'OFF', which means that the function limit is not to be executed (i.e., the function limiting table 40 is not to be used). The function limiting flag 38 is set to 'ON' or 'OFF' by an administrator of the multi-functional device 10.

The function limiting table 40 is a table in which one or more user information is registered. Each of the user information is a combination of a user ID, a password, print permission information, scan permission information and copy permission information. Each of the user information is registered in the function limiting table 40 when the administrator of the multi-functional device 10 accesses the multi-functional device 10 from the terminal apparatus (for example, 50), for example. The user ID and the password are user identification information for identifying a user. In this illustrative embodiment, a user ID 'U1' and a password 'P1' are allotted to a first individual user, and a user ID 'U2' and a password 'P2' are allotted to a second individual user different from the first individual user. In the below, the user information including a user ID and a password allotted to an individual user is referred to as 'individual user information.' In the meantime, the individual user may not be one user and may be a group of a plurality of users. A situation where a general user who is each user who is different from the individual users uses the multi-functional device 10 is also assumed. For this reason, in the function limiting table 40, not only the individual user information but also general user information, which includes a user ID 'Public' indicative of the general user, is described. In the general user information, a password is not set.

The print permission information is information indicative of whether or not to permit a user to use the printing function. Likewise, the scan permission information and the copy permission information are information indicative of whether or not to permit a user to use the scan function and the copy function, respectively. 'OK' indicates that use of a function is permitted, and 'NG' indicates that use of a function is not permitted. In the example of FIG. 1, the first individual user corresponding to the user ID 'U1' is permitted to use all of the printing function, the scan function and the copy function. The second individual user corresponding to the user ID 'U2' is permitted to use the scan function and the copy function but is not permitted to use the printing function. Also, the general user is permitted to use the scan function but is not permitted to use the printing function and the copy function.

When the administrator sets the permission information relating to any function in the general user information to 'OK,' the permission information of the corresponding function in all the individual user information may be automatically set to 'OK.' For instance, in the example of FIG. 1, the scan permission information in the general user information is set to 'OK', and therefore, the scan permission information in all the individual user information may be automatically set to 'OK.'

In a case where the user is notified of the user identification information (i.e., the user ID and the password) from the administrator of the multi-functional device 10, the user inputs the user identification information upon using the multi-functional device 10. For example, in a case where the user selects a desired function (for example, the copy function) by operating the operation unit 12 of the multi-functional device 10, the user inputs the user identification information by operating the operation unit 12. In this case, the multi-functional device 10 permits or prohibits the using of the function, depending on the permission information in the individual user information including the input user identification information. Also, for example, in a case where the user wants to enable the multi-functional device 10 to execute a desired function by using the terminal apparatus (for example, 50), the user inputs the user identification information into the terminal apparatus. In this case, the multi-functional device 10 receives a function execution request (a PJL command, a IPP command and the like, which will be described later) including the input user identification information from the terminal apparatus, and permits or prohibits the using of the function, depending on the permission information in the individual user information including the input user identification information.

(Configuration of Terminal Apparatuses 50, 60)

Each of the terminal apparatuses 50, 60 is a user terminal such as a desktop Personal Computer (PC), a notebook, a tablet PC, a mobile phone, a smart phone and the like. The terminal apparatus 50 has a multi-functional device driver 52, which is a driver program for the multi-functional device 10. The multi-functional device driver 52 may be installed into the terminal apparatus 50 from a medium shipped together with the multi-functional device 10 or may be installed into the terminal apparatus 50 from a server provided by a vendor of the multi-functional device 10, for example.

The multi-functional device driver 52 includes a Print Job Language (PJL) program for enabling the multi-functional device 10 to execute the printing function. The terminal apparatus 50 can transmit a PJL command to the multi-functional device 10 and enable the multi-functional device 10 to execute the printing function by using the PJL program. In the meantime, the PJL is just one method for implementing the printing function. That is, in a modified embodiment, the multi-functional device driver 52 may transmit a command conforming to other protocol (for example, Line PRinter daemon protocol (LPR)) to the multi-functional device 10 and enable the multi-functional device 10 to execute the printing function.

The terminal apparatus 60 does not have the multi-functional device driver 52. For this reason, the terminal apparatus 60 cannot transmit the PJL command to the multi-functional device 10 and enable the multi-functional device 10 to execute the printing function. However, the terminal apparatus 60 has an Internet Printing Protocol (IPP) program installed from a server on the Internet, which is provided by a business provider different from the vendor of the multi-functional device 10, for example. The IPP program is a program configured to create an IPP command conforming to a Hyper Text Transfer Protocol (HTTP) and to transmit the IPP command to the multi-functional device 10. The terminal apparatus 60 can use the HTTP if it has a well-known web browser program, so that the terminal apparatus 60 can transmit the IPP command to the multi-functional device 10 and enable the multi-functional device 10 to execute the printing function by using the IPP program. That is, the terminal apparatus 60 can enable the multi-functional device 10 to execute the printing function even though it does not have the multi-functional device driver 52 provided by the vendor of the multi-functional device 10.

Figure 2:
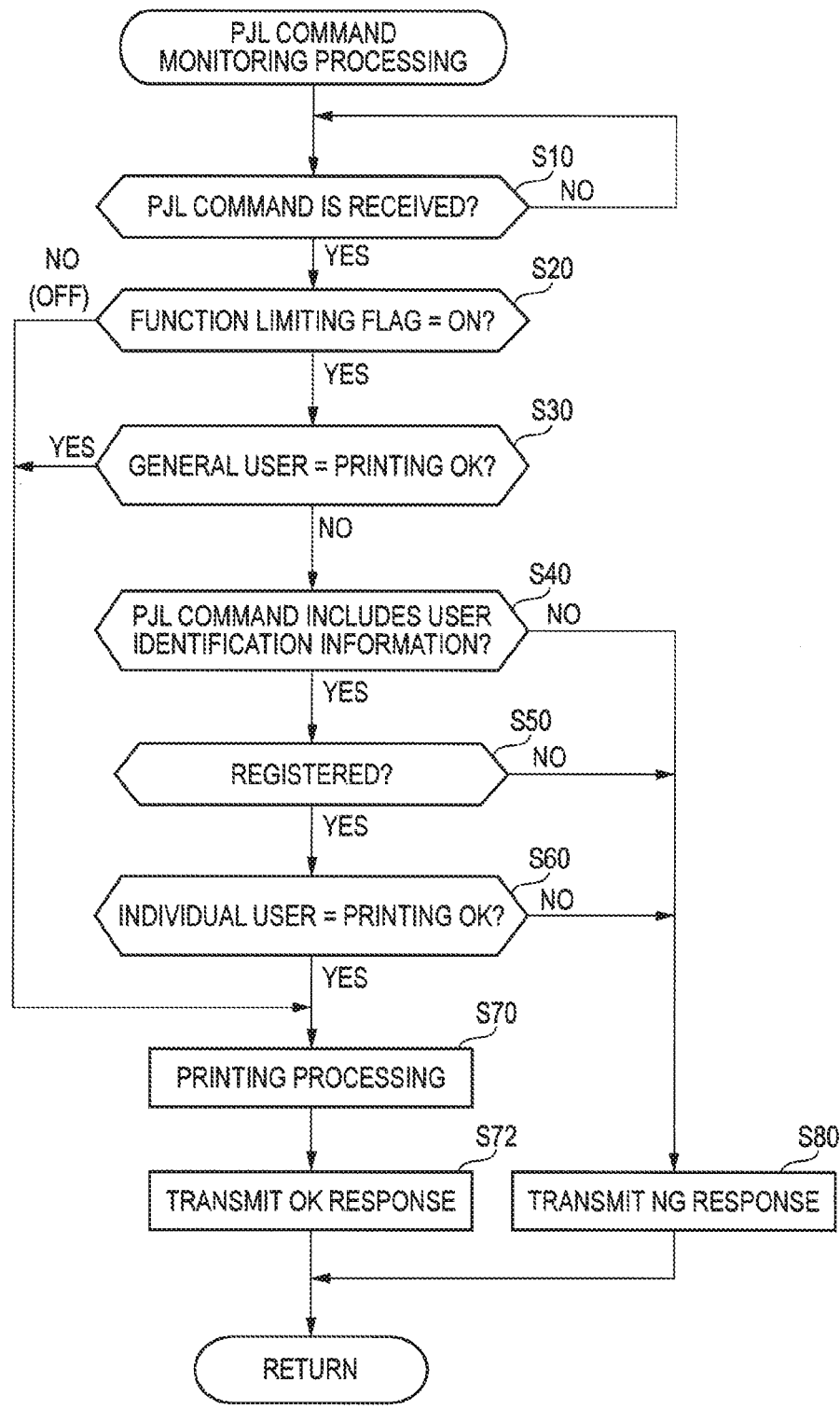
FIG. 2 is a flowchart of PJL command monitoring processing.

(PJL Command Monitoring Processing; FIG. 2)

Subsequently, PJL command monitoring processing that is to be executed by the CPU 32 of the multi-functional device 10 is described with reference to FIG. 2. In the PJL command monitoring processing, the CPU 32 monitors whether a PJL command conforming to the multi-functional device driver 52 is received, and executes processing in accordance with the received PJL command.

In S10, the CPU 32 monitors whether a PJL command is received from the terminal apparatus 50 through the network I/F 20. In a case where a PJL command is received, the CPU 32 determines 'YES' in S10, and proceeds to S20.

The PJL command is a command for requesting the multi-functional device 10 to execute the printing function, and is transmitted from the terminal apparatus 50 to the multi-functional device 10 in a case where a print instruction operation is made at the terminal apparatus 50. The print instruction operation includes a file selection operation for selecting a file, which represents an image of a printing target in the terminal apparatus 50, and a variety of operations that are executed on a screen displayed in accordance with the multi-functional device driver 52. The variety of operations include a printing condition designation operation for designating a desired printing condition (for example, a printing resolution, a sheet size and the like), an input operation for inputting the user identification information (i.e., the user ID and the password) and a button selection operation for selecting a button indicative of execution of the printing. In a case where the user of the terminal apparatus 50 is notified of the user identification information from the administrator of the multi-functional device 10, i.e., in a case where the individual user information corresponding to the user has been registered in the function limiting table 40 of the multi-functional device 10, the user executes the input operation. On the other hand, in a case where the user is not notified of the user identification information from the administrator of the multi-functional device 10, i.e., in a case where the individual user information corresponding to the user has not been registered in the function limiting table 40, the user does not execute the input operation.

In a case where the print instruction operation including the input operation is executed at the terminal apparatus 50, the PJL command includes print data created by the terminal apparatus 50 from the file selected by the file selection operation, a printing condition designated by the printing condition designation operation, and the user identification information input by the input operation. Here, the print data is data having a data format, which can be interpreted by the printing engine 16 of the multi-functional device 10, and is created by converting the selected file with the terminal apparatus 50. Also, in a case where the print instruction operation, which does not include the input operation, is executed at the terminal apparatus 50, the PJL command includes the print data and the printing condition and does not include the user identification information.

In S20, the CPU 32 determines whether the function limiting flag 38 in the memory 34 indicates 'ON'. In a case where it is determined that the function limiting flag 38 indicates 'ON' (YES in S20), the CPU 32 proceeds to S30. On the other hand, in a case where it is determined that the function limiting flag 38 indicates 'OFF' (NO in S20), the CPU 32 skips over S30 to S60 because it is not necessary to limit a function, and executes printing processing in S70, which will be described later.

In S30, the CPU 32 acquires the general user information from the function limiting table 40 in the memory 34, and determines whether the print permission information in the general user information indicates 'OK.' In a case where it is determined that the print permission information indicates 'OK' (YES in S30), the CPU 32 skips over S40 to S60 because all the users are permitted to use the printing function, and executes printing processing in S70, which will be described later. On the other hand, in a case where it is determined that the print permission information indicates 'NG' (NO in S30), the CPU 32 proceeds to S40.

In S40, the CPU 32 determines whether the PJL command includes the user identification information. In a case where it is determined that the PJL command includes the user identification information (YES in S40), the CPU 32 proceeds to S50. On the other hand, in a case where it is determined that the PJL command does not include the user identification information (NO in S40), the CPU 32 does not execute the printing processing because the general user is not permitted to use the printing function, and transmits an NG response to the terminal apparatus 50 through the network I/F 20 in S80. The NG response is a command indicating that the printing function cannot be executed, and includes a message (for example, a character string 'the user authentication fails') indicating that the user is not permitted to use the printing function, for example. When the processing of S80 is over, the CPU 32 returns to S10.

In S50, the CPU 32 determines whether the user identification information in the PJL command has been registered in the function limiting table 40 in the memory 34. In a case where it is determined that the user identification information has been registered (YES in S50), the CPU 32 proceeds to S60. On the other hand, in a case where it is determined that the user identification information has not been registered (NO in S50), the CPU 32 does not execute the printing processing because the user of the terminal apparatus 50 is not permitted to use the printing function, and transmits the NG response to the terminal apparatus 50 in S80.

In S60, the CPU 32 acquires the individual user information including the user identification information in the PJL command from the function limiting table 40 in the memory 34 and determines whether the print permission information in the acquired individual user information indicates 'OK.' In a case where it is determined that the print permission information indicates 'OK' (YES in S60), the CPU 32 proceeds to S70. On the other hand, in a case where it is determined that the print permission information indicates 'NG' (NO in S60), the CPU 32 does not execute the printing processing because the user of the terminal apparatus 50 is not permitted to use the printing function, and transmits the NG response to the terminal apparatus 50 in S80.

In S70, the CPU 32 executes the printing processing in accordance with the PJL command. Specifically, the CPU 32 provides the printing condition in the PJL command to the printing engine 16, and also supplies the print data in the PJL command to the printing engine 16. Thereby, the printing engine 16 prints an image represented by the print data. In S72, the CPU 32 transmits an OK response, which indicates that the printing has been completed, to the terminal apparatus 50. When the processing of S72 is over, the CPU 32 returns to S10.

Figure 3:
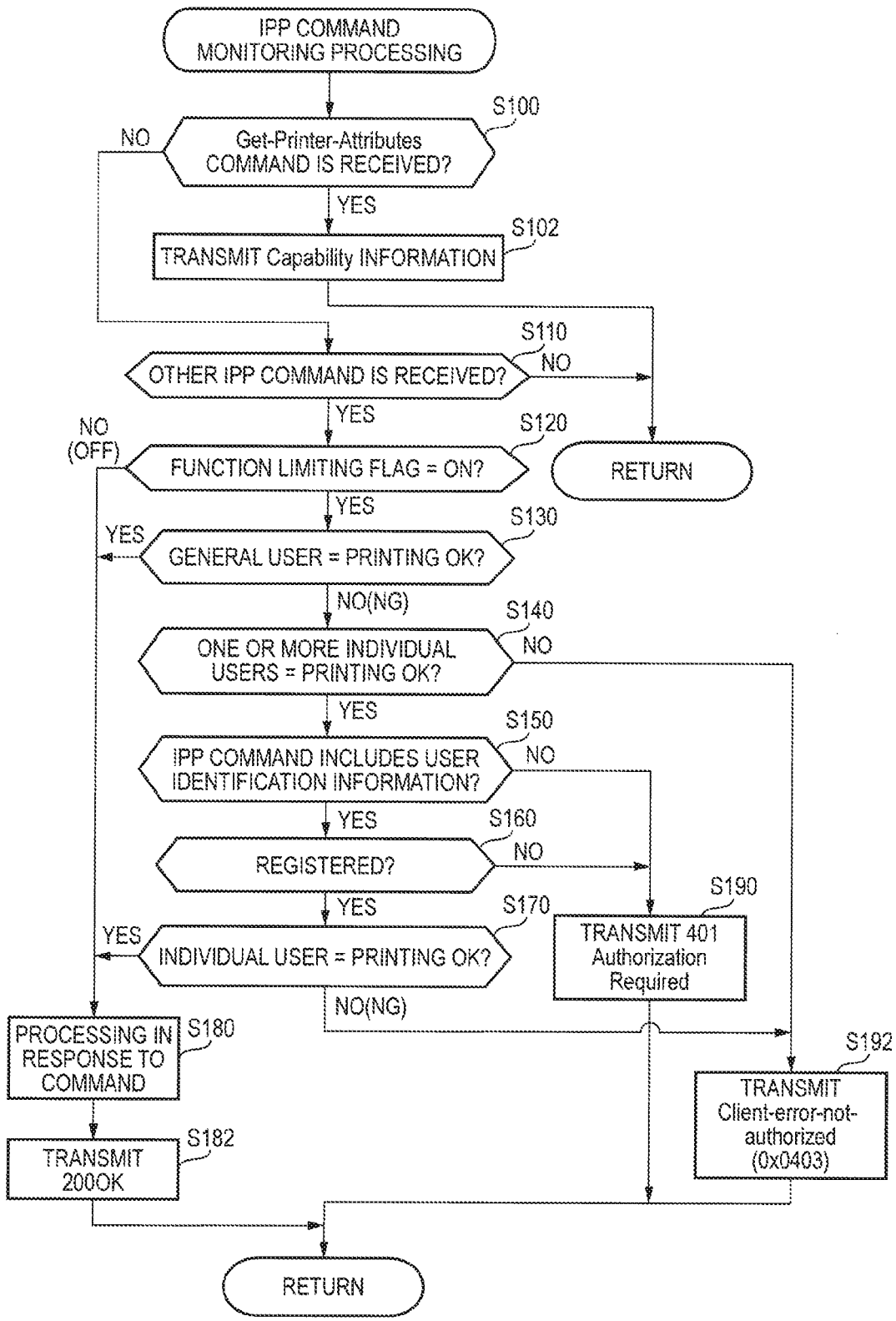
FIG. 3 is a flowchart of IPP command monitoring processing.

(IPP Command Monitoring Processing; FIG. 3)

Subsequently, IPP command monitoring processing that is to be executed by the CPU 32 of the multi-functional device 10 is described with reference to FIG. 3. In the IPP command monitoring processing, the CPU 32 monitors whether an IPP command, which does not conform to the multi-functional device driver 52, is received, and executes processing in accordance with the received IPP command.

In this illustrative embodiment, an IPP command that can be received at the multi-functional device 10 includes a Get-Printer-Attributes command (hereinafter, referred to as 'GPA command'), a Validate-Job command (hereinafter, referred to as 'VJ command'), a Create-Job command (hereinafter, referred to as 'CJ command'), and a Send-Document command (hereinafter, referred to as 'SD command').

The GPA command is a command for requesting the multi-functional device 10 to transmit Capability information indicative of all the printing conditions that can be used by the multi-functional device 10. The VJ command is a command for requesting the multi-functional device 10 to execute the printing function, and particularly, a command for inquiring whether the printing condition designated by the user is appropriate for the multi-functional device 10. The CJ command is a command for requesting the multi-functional device 10 to execute the printing function, and particularly, a command for requesting the multi-functional device 10 to create a job ID for identifying a print job. The SD command is a command for requesting the multi-functional device 10 to execute the printing function, and particularly, a command for transmitting the print data to the multi-functional device 10.

The CPU 32 sequentially executes the respective monitoring processing of S100 and S110. In S100, the CPU 32 monitors whether a GPA command is received from the terminal apparatus 60 through the network I/F 20. In a case where a GPA command is received, the CPU 32 determines 'YES' in S100 and proceeds to S102. In a case where a trigger operation is executed at the terminal apparatus 60, the GPA command is transmitted from the terminal apparatus 60 to the multi-functional device 10. The trigger operation includes a file selection operation for selecting a file, which represents an image of a printing target in the terminal apparatus 60, and a button selection operation for selecting a button indicative of execution of the printing in a screen that is to be displayed in accordance with the IPP program.

In S102, the CPU 32 transmits the Capability information to the terminal apparatus 60 through the network I/F 20. In this illustrative embodiment, the Capability information includes information (for example, JPEG, PDF and the like) indicative of one or more data formats that can be interpreted by the printing engine 16 of the multi-functional device 10, information (for example, 100 dpi to 1200 dpi) indicative of a range of the printing resolutions, and information (for example, A4, A3, B4 and the like) indicative of one or more sheet sizes. When the processing of S102 is over, the CPU 32 returns to S100.

In S110, the CPU 32 monitors whether an IPP command (i.e., the VJ command, the CJ command, or the SD command) other than the GPA command is received from the terminal apparatus 60 through the network I/F 20. In a case where an IPP command other than the GPA command is received, the CPU 32 determines 'YES' in S110 and proceeds to S120.

The VJ command is transmitted from the terminal apparatus 60 to the multi-functional device 10 in a case where a printing condition designation operation is executed at the terminal apparatus 60 after the Capability information is received by the terminal apparatus 60. The printing condition designation operation is an operation for designating a desired printing condition in a setting screen that is to be displayed in accordance with the IPP program. The printing condition includes one printing resolution, which is to be designated from a range of printing resolutions indicated by the Capability information, and one sheet size, which is to be designated from one or more sheet sizes indicated by the Capability information. The CJ command is transmitted from the terminal apparatus 60 to the multi-functional device 10 in a case where a 200OK (refer to S182, which will be described later), which is a response to the VJ command, is received by the terminal apparatus 60. The SD command is transmitted from the terminal apparatus 60 to the multi-functional device 10 in a case where a 200OK, which is a response to the CJ command, is received by the terminal apparatus 60.

The processing of S120 and S130 is the same as the processing of S20 and S30 of FIG. 2. In a case where the CPU 32 determines 'YES' in S120, the CPU 32 proceeds to S130. On the other hand, in a case where the CPU 32 determines 'NO' in S120, the CPU 32 skips over S130 to S170 because it is not necessary to limit a function, and executes processing in accordance with the IPP command in S180, which will be described later. Also, in a case where the CPU 32 determines 'YES' in S130, the CPU 32 skips over S140 to S170 because all the users are permitted to use the printing function, and executes processing in accordance with the IPP command in S180, which will be described later. On the other hand, in a case where the CPU 32 determines 'NO' in S130, the CPU 32 proceeds to S140.

In S140, the CPU 32 acquires all the individual user information from the function limiting table 40 in the memory 34, and determines whether one or more OK individual user information exists in all the acquired individual user information. Here, the OK individual user information is the individual user information including the print permission information indicative of 'OK.' In a case where it is determined that one or more OK individual user information exists (YES in S140), the CPU 32 proceeds to S150. On the other hand, in a case where it is determined that any one OK individual information does not exist (NO in S140), the CPU 32 does not request the terminal apparatus 60 to transmit the user identification information (i.e., does not execute processing of S190) because all the users are not permitted to use the printing function, and transmits error information, which is a command conforming to the IPP, to the terminal apparatus 60 through the network I/F 20, in S192. Here, the error information is a command that is defined with the IPP, and specifically, is a Client-error-not-authorized command. A code of the command is '0x0403.' Therefore, hereinafter, the command is referred to as '403 command.' When the processing of S192 is over, the CPU 32 returns to S100.

In S150, the CPU 32 determines whether the IPP command includes the user identification information. In a case where it is determined that the IPP command includes the user identification information (YES in S150), the CPU 32 proceeds to S160. On the other hand, in a case where it is determined that the IPP command does not include the user identification information (NO in S150), the CPU 32 transmits a request for authentication, which is a command conforming to the HTTP, to the terminal apparatus 60 through the network I/F 20 in S190 so as to request the terminal apparatus 60 to transmit the user identification information. Here, the request for authentication is a command defined with the HTTP, not a command defined with the IPP, and specifically, is 401AuthorizationRequired. Hereinafter, the command is referred to as '401 command' When the processing of S190 is over, the CPU 32 returns to S100.

In S160, the CPU 32 determines whether the user identification information in the IPP command has been registered in the function limiting table 40 in the memory 34. In a case where it is determined that the user identification information has been registered (YES in S160), the CPU 32 proceeds to S170. On the other hand, in a case where it is determined that the user identification information has not been registered (NO in S160), the CPU 32 transmits the 401 command to the terminal apparatus 60 in S190 so as to request the terminal apparatus 60 to transmit the user identification information.

In S170, the CPU 32 acquires the individual user information including the user identification information in the IPP command from the function limiting table 40 in the memory 34, and determines whether the print permission information in the acquired individual user information indicates 'OK.' In a case where it is determined that the print permission information indicates 'OK' (YES in S170), the CPU 32 proceeds to S180. On the other hand, in a case where it is determined that the print permission information indicates 'NG' (NO in S170), the CPU 32 transmits the 403 command to the terminal apparatus 60 in S192 without requesting the terminal apparatus 60 to transmit the user identification information (i.e., without executing the processing of S190) because the user of the terminal apparatus 60 is not permitted to use the printing function.

In S180, the CPU 32 executes processing in accordance with the IPP command Specifically, in a case where the VJ command is received, the CPU 32 determines whether the printing condition in the VJ command is appropriate for the multi-functional device 10, i.e., whether the multi-functional device 10 can use the printing condition in the VJ command. As described above, in the printing condition designation operation that is to be executed at the terminal apparatus 60, the printing condition within the range of the Capability information is designated. For this reason, the CPU 32 usually determines in S180 that the printing condition in the VJ command is appropriate for the multi-functional device 10, and transmits the 200OK to the terminal apparatus 60 through the network I/F 20 in S182. The 200OK is a command defined with the HTTP, not the IPP, and specifically, is a command indicating that the processing has been normally completed.

Also, in a case where the CJ command is received, the CPU 32 creates a unique job ID in S180, and transmits the 200OK including the job ID to the terminal apparatus 60 in S182. In the meantime, the CJ command includes the printing condition designated by the printing condition designation operation.

Also, in a case where the SD command is received, the CPU 32 executes the printing processing in S180. The SD command includes the print data created by the terminal apparatus 60 from the file selected through the file selection operation, and the printing condition designated through the printing condition designation operation. Here, the print data is data having a data format (i.e., any one data format indicated by the Capability information) that can be interpreted by the printing engine 16 of the multi-functional device 10, and is created by converting the selected file with the terminal apparatus 60. The CPU 32 provides the printing condition in the SD command to the printing engine 16, and also supplies the print data to the printing engine 16. Thereby, the printing engine 16 prints an image represented by the print data. In S182, the CPU 32 transmits the 200OK to the terminal apparatus 60. When the processing of S182 is over, the CPU 32 returns to S100.

Figure 4:
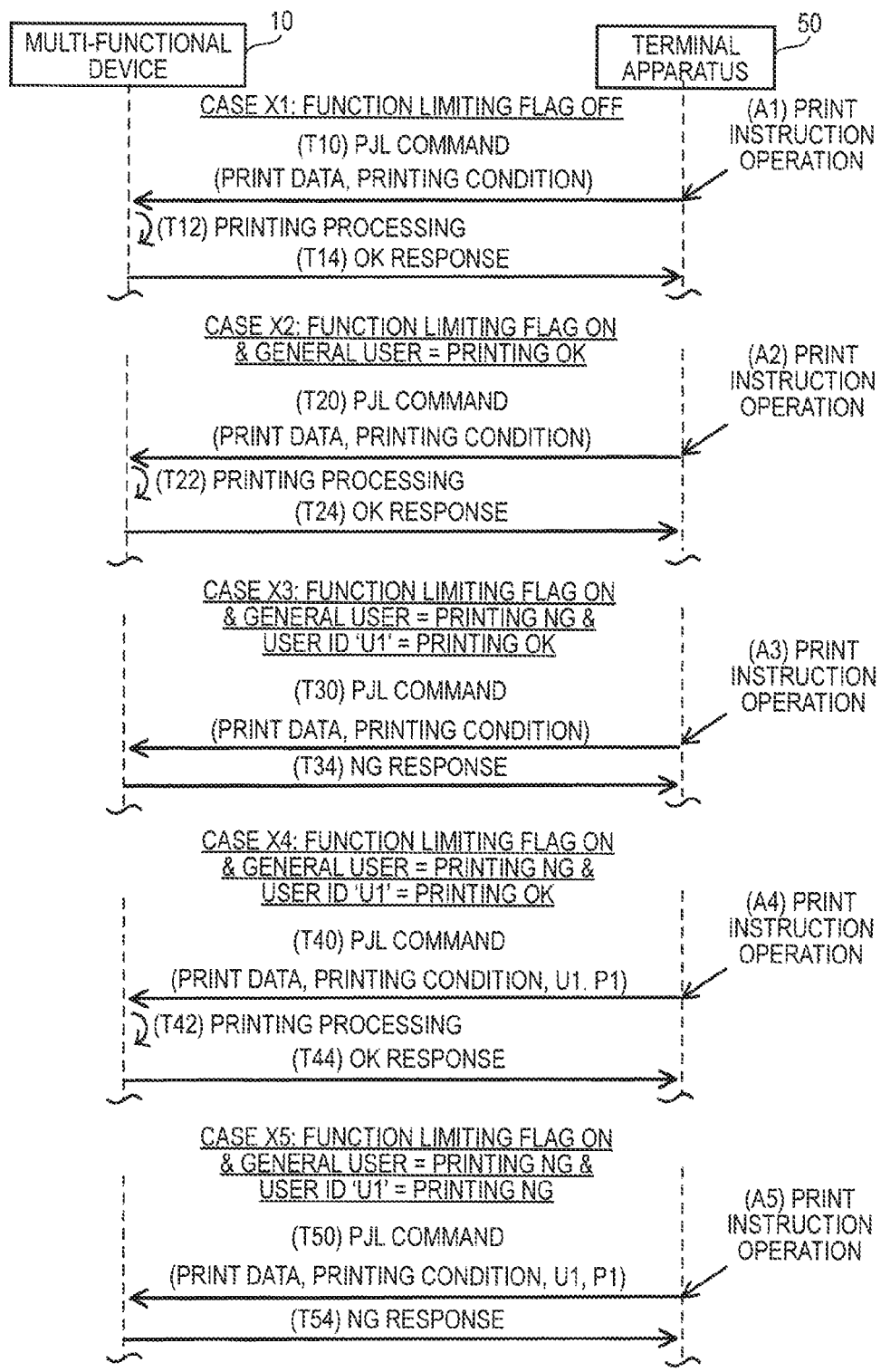
FIG. 4 is a sequence diagram of cases X1 to X5 where a PJL command is received.

(Case X where Multi-Functional Device 10 Receives PJL Command; FIG. 4)

Subsequently, specific cases that are to be implemented by the PJL command monitoring processing of FIG. 2 are described with reference to FIG. 4. In the below, cases X1 to X5 are sequentially described.

In the case X1, the function limiting flag 38 of the multi-functional device 10 indicates 'OFF.' In a case where a print instruction operation of A1 is executed, the terminal apparatus 50 transmits a PJL command including print data and a printing condition to the multi-functional device 10 in T10. Here, the print data in the PJL command is data created from the file selected through the file selection operation included in the print instruction operation of A1. Also, the printing condition in the PJL command is a printing condition designated through the printing condition designation operation included in the print instruction operation of A1. In the print instruction operation of A1, an input operation for inputting the user identification information is not executed. Therefore, the PJL command does not include the user identification information.

In a case where the PJL command is received from the terminal apparatus 50 (YES in S10 of FIG. 2), the multi-functional device 10 determines that the function limiting flag 38 indicates 'OFF' (NO in S20), executes the printing processing in T12 (S70), and transmits an OK response to the terminal apparatus 50 in T14 (S72). In this way, in a case where the function limiting flag 38 is 'OFF', the multi-functional device 10 executes the printing function in accordance with the PJL command, irrespective of whether the PJL command includes the user identification information and irrespective of the contents of the respective individual user information and the general user information in the function limiting table 40.

In the case X2, the function limiting flag 38 of the multi-functional device 10 indicates 'ON', and the print permission information included in the general user information of the function limiting table 40 indicates 'OK' (hereinafter described as 'general user=printing OK'). A2 and T20 are the same as A1 and T10 of the case X1.

The multi-functional device 10 determines the 'general user=printing OK' (YES in S20 of FIG. 2, YES in S30). In this case, the multi-functional device 10 executes the printing processing in T22 (S70), and transmits the OK response to the terminal apparatus 50 in T24 (S72). In this way, in case of the 'general user=printing OK', the multi-functional device 10 executes the printing function in accordance with the PJL command irrespective of whether the PJL command includes the user identification information.

In the case X3, the function limiting flag 38 of the multi-functional device 10 indicates 'ON', the print permission information included in the general user information of the function limiting table 40 indicates 'NG' (hereinafter described as 'the general user=printing NG'), and the print permission information corresponding to the user ID 'U1' indicates 'OK' (hereinafter described as 'the user ID 'U1'=printing OK'). A3 and T30 are the same as A1 and T10 of the case X1.

The multi-functional device 10 determines the 'general user=printing NG' (YES in S20 of FIG. 2, NO in S30), and determines that the PJL command does not include the user identification information (NO in S40). In this case, the multi-functional device 10 transmits an NG response to the terminal apparatus 50 in T34 without executing the printing processing (S80). In this way, in a case where the PJL command, which does not include the user identification information, is received at the state of the 'general user=printing NG', the multi-functional device 10 limits the using of the printing function.

In the case X4, the state of the multi-functional device 10 is the same as the case X3. A print instruction operation of A4 includes an input operation for inputting the user identification information including the user ID 'U1' and the password 'P1.' For this reason, the PJL command of T40 includes the user identification information 'U1' and 'P1.'

The multi-functional device 10 determines that the PJL command includes the user identification information 'U1' and 'P1' (YES in S20 of FIG. 2, NO in S30, YES in S40), determines that a combination of 'U1' and 'P1' has been registered in the function limiting table 40 (YES in S50), and determines the 'user ID 'U1'=printing OK' (YES in S60). In this case, the multi-functional device 10 executes the printing processing in T42 (S70), and transmits an OK response to the terminal apparatus 50 in T44 (S72). In this way, in the case of the 'user ID 'U1'=printing OK', the multi-functional device 10 executes the printing function in accordance with the PJL command including the user identification information 'U1' and 'P1.'

In the case X5, the function limiting flag 38 of the multi-functional device 10 indicates 'ON', the 'general user=printing NG', and the print permission information corresponding to the user ID 'U1' indicates 'NG' (hereinafter described as 'the user ID 'U1'=printing NG'). A5 and T50 are the same as A4 and T40 of the case X4. For this reason, the PJL command of T50 includes the user identification information 'U1' and 'P1.'

The multi-functional device 10 determines the 'user ID 'U1'=printing NG' (YES in S20, NO in S30, YES in S40, YES in S50, NO in S60). In this case, the multi-functional device 10 transmits an NG response to the terminal apparatus 50 in T54 without executing the printing processing (S80). In this way, in a case where the PJL command including the user identification information 'U1' and 'P1' is received at the state of the 'user ID 'U1'=printing NG', the multi-functional device 10 limits the using of the printing function.

Figure 5:
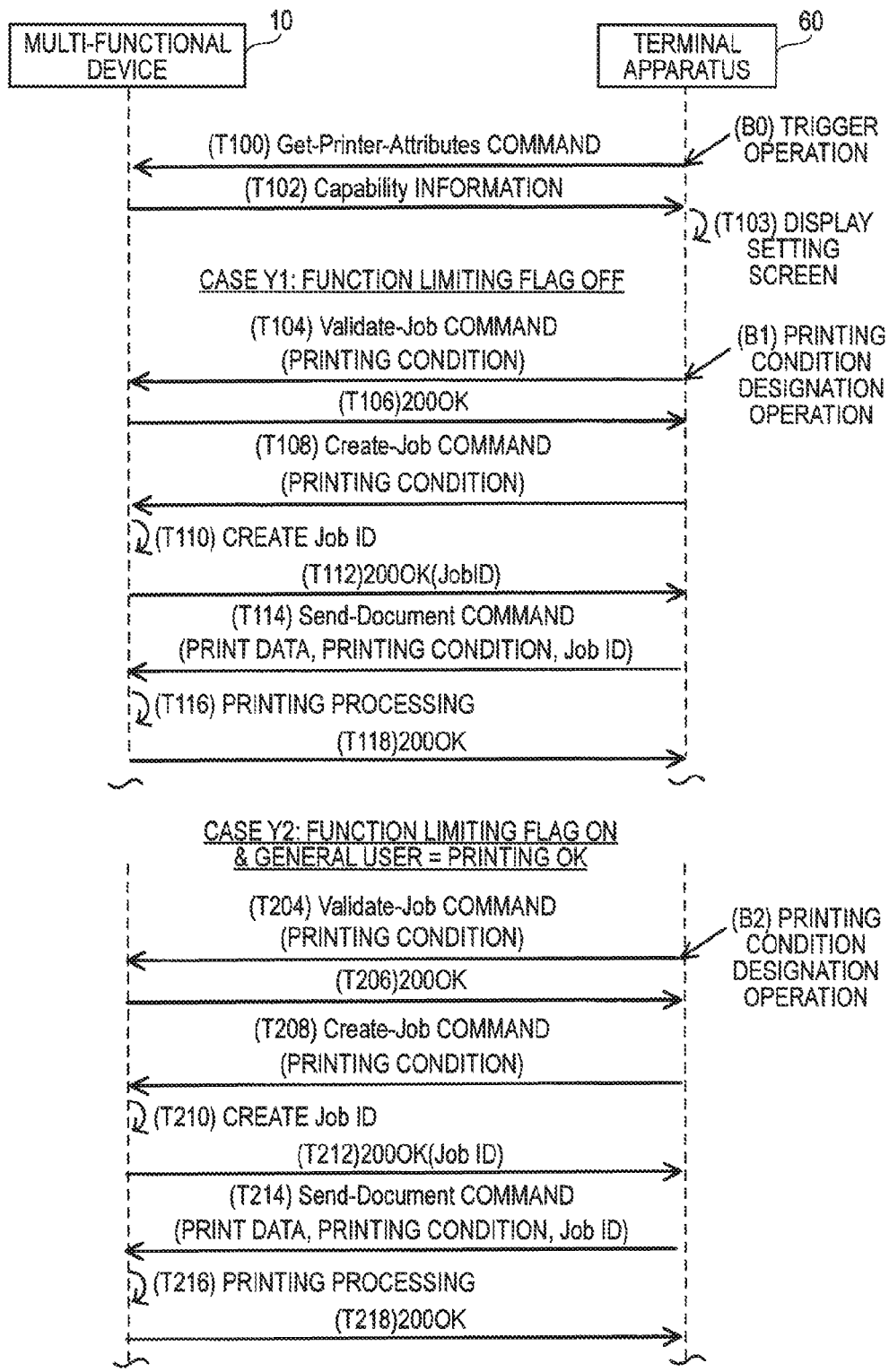
FIG. 5 is a sequence diagram of cases Y1 and Y2 where an IPP command is received.
Figure 6:
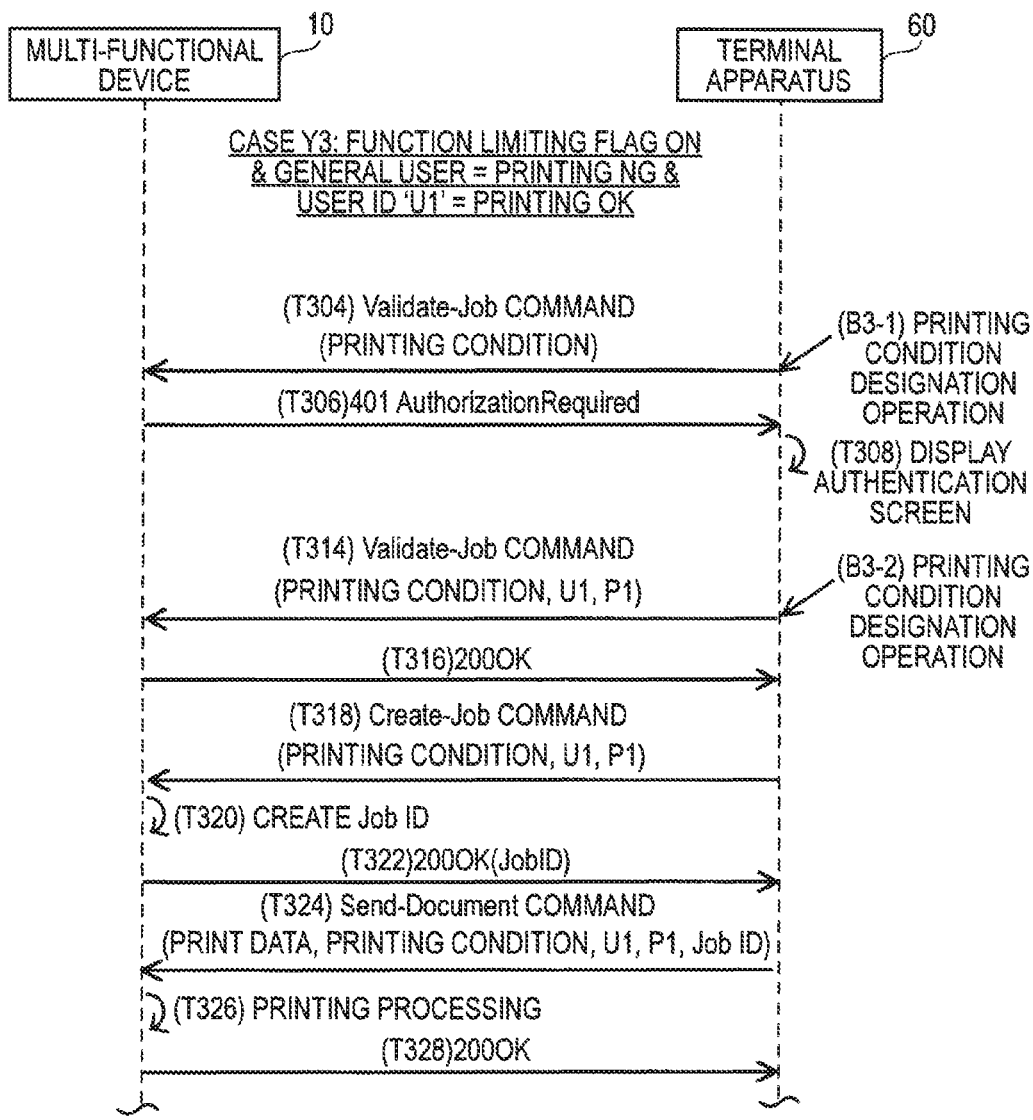
FIG. 6 is a sequence diagram of a case Y3 where the IPP command is received.
Figure 7:
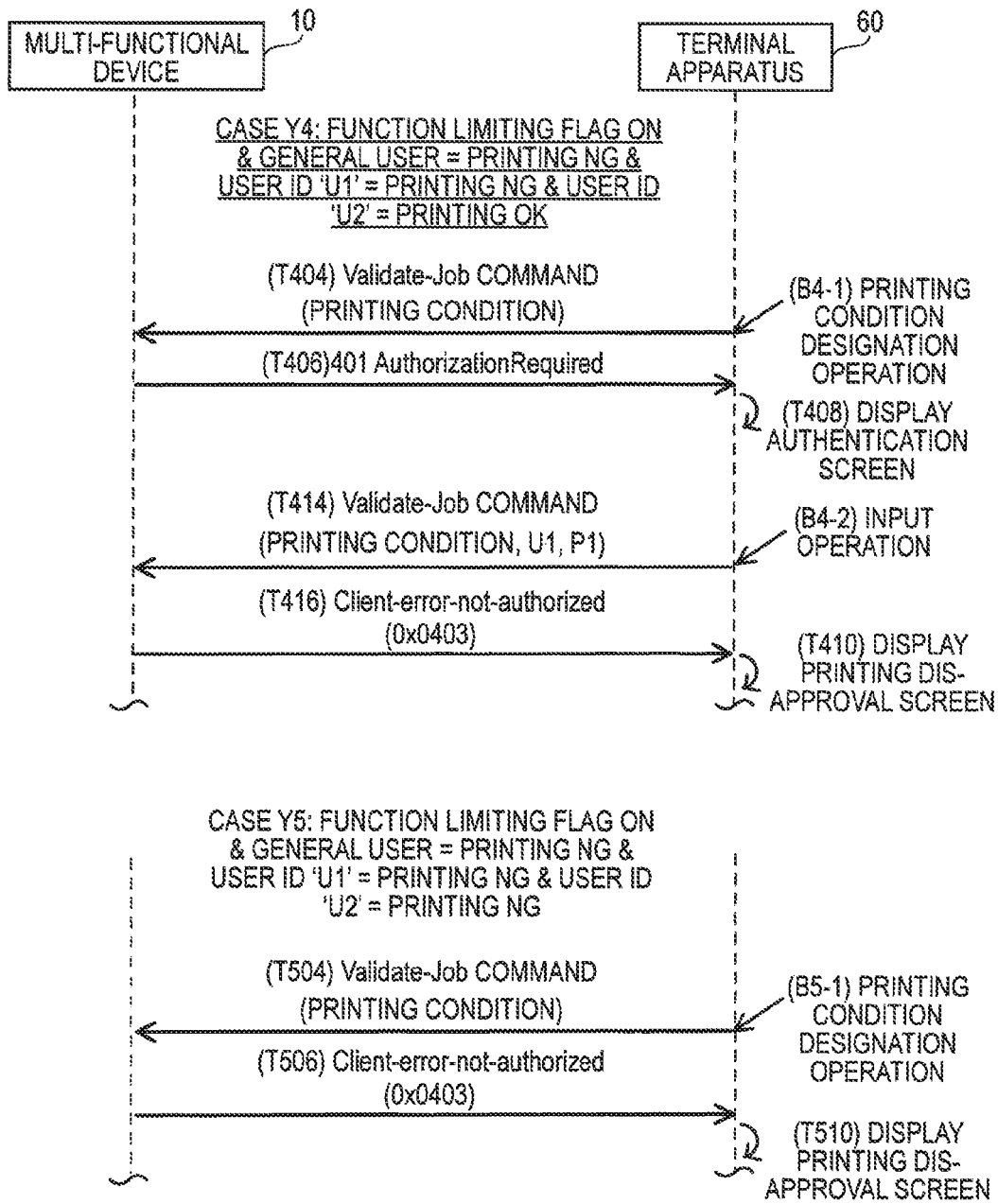
FIG. 7 is a sequence diagram of cases Y4 and Y5 where the IPP command is received.

(Case Y where Multi-Functional Device 10 Receives IPP Command; FIGS. 5 to 7)

Subsequently, specific cases that are to be implemented by the IPP command monitoring processing of FIG. 3 are described with reference to FIGS. 5 to 7. As shown in FIG. 5, in a case where a trigger operation of B0 is executed, the terminal apparatus 60 transmits a GPA command to the multi-functional device 10 in T100.

In a case where the GPA command is received from the terminal apparatus 60 (YES in S100 of FIG. 3), the multi-functional device 10 transmits the Capability information to the terminal apparatus 60 in T102 (S102). That is, the multi-functional device 10 transmits the Capability information to the terminal apparatus 60 in response to the GPA command irrespective of whether the function limiting flag 38 indicates 'ON' or 'OFF' and irrespective of the contents of the respective individual user information and the general user information in the function limiting table 40.

In a case where the Capability information is received from the multi-functional device 10, the terminal apparatus 60 displays a setting screen in T103. The setting screen is a screen for executing the printing condition designation operation for designating the printing condition including the printing resolution and the sheet size from the range of the Capability information. Hereinafter, cases Y1 to Y5 that are to be implemented after the setting screen is displayed in T103 are sequentially described.

In the case Y1, the function limiting flag 38 of the multi-functional device 10 indicates 'OFF.' In a case where a printing condition designation operation of B1 is executed, the terminal apparatus 50 transmits a VJ command including the printing condition to the multi-functional device 10 in T104. Here, in the setting screen (refer to FIG. 3) in accordance with the IPP program, it is not possible to execute the input operation for inputting the user identification information. For this reason, the VJ command that is first transmitted after the printing condition designation operation is executed does not include the user identification information.

In a case where the VJ command is received from the terminal apparatus 60 (YES in S110 of FIG. 3), the multi-functional device 10 determines that the function limiting flag 38 indicates 'OFF' (NO in S120), determines that the printing condition in the VJ command is appropriate for the multi-functional device 10 (S180), and transmits the 200OK to the terminal apparatus 60 in T106 (S182).

In a case where the 200OK is received from the multi-functional device 10, in response to the VJ command, the terminal apparatus 60 transmits a CJ command including the printing condition to the multi-functional device 10 in T108 without receiving an operation from the user. Here, the printing condition in the CJ command is the same as the printing condition in the VJ command of T104. The CJ command does not include the user identification information.

In a case where the CJ command is received from the terminal apparatus 60 (YES in S110 of FIG. 3), the multi-functional device 10 determines that the function limiting flag 38 indicates 'OFF' (NO in S120), creates a job ID in T110 (S180), and transmits the 200OK including the created job ID to the terminal apparatus 60 in T112 (S182).

In a case where the 200OK is received from the multi-functional device 10, in response to the CJ command, the terminal apparatus 60 transmits an SD command including the print data, the printing condition and the job ID to the multi-functional device 10 in T114 without receiving an operation from the user. Here, the print data in the SD command is data created from the file selected through the file selection operation included in the trigger operation of B0. The printing condition in the SD command is the same as the printing condition (i.e., the printing condition in the CJ command of T108) in the VJ command of T104. Also, the job ID in the SD command is the same as the job ID included in the 200OK of T112.

In a case where the SD command is received from the terminal apparatus 60 (YES in S110 of FIG. 3), the multi-functional device 10 determines that the function limiting flag 38 indicates 'OFF' (NO in S120), executes the printing processing in T116 (S180), and transmits an OK response to the terminal apparatus 50 in T118 (S182). In this way, in a case where the function limiting flag 38 is 'OFF', the multi-functional device 10 executes the printing function in accordance with the IPP command irrespective of whether the IPP command (i.e., the VJ command, the CJ command, and the SD command) includes the user identification information and irrespective of the contents of the respective individual user information and the general user information in the function limiting table 40.

In the case Y2, the function limiting flag 38 of the multi-functional device 10 indicates 'ON', and the general user=printing OK. B2 and T204 are the same as B1 and T104 of the case Y1. In a case where the VJ command is received from the terminal apparatus 60 (YES in S110 of FIG. 3), the multi-functional device 10 determines that the function limiting flag 38 indicates 'ON' (YES in S120), and determines the 'general user=printing OK' (YES in S130).

The processing of T206 to T218 that is to be sequentially executed is the same as the processing of T106 to T118 of the case Y1. However, in a case where the CJ command of T208 or the SD command of T214 is received from the terminal apparatus 60 (YES in S110 of FIG. 3), the multi-functional device 10 determines that the function limiting flag 38 indicates 'ON' (YES in S120), determines the 'general user=printing OK' (YES in S130), and executes the processing in accordance with the IPP command (S180). In this way, in the case of 'the general user=printing OK', the multi-functional device 10 executes the printing function in accordance with the IPP command irrespective of whether the IPP command includes the user identification information.

(Case Y3; FIG. 6)

In the case Y3 of FIG. 6, the function limiting flag 38 of the multi-functional device 10 indicates 'ON', the 'general user=printing NG', and 'the user ID 'U1'=printing OK'. B3-1 and T304 are the same as B1 and T104 of the case Y1 of FIG. 5. In a case where the VJ command of T304 is received from the terminal apparatus 60 (YES in S110 of FIG. 3), the multi-functional device 10 determines the 'general user=printing NG' (YES in S120, NO in S130), determines that there is at least one OK individual user information (YES in S140) because of 'the user ID 'U1'=printing OK', and determines that the VJ command does not include the user identification information (NO in S150). For this reason, the multi-functional device 10 transmits a 401 command to the terminal apparatus 60 in T306.

In a case where the 401 command is received from the multi-functional device 10, the terminal apparatus 60 displays an authentication screen for inputting the user identification information. In a case where an input operation B3-2 for inputting the user identification information 'U1' and 'P1' is executed, the terminal apparatus 60 transmits the VJ command, which includes the printing condition and the user identification information 'U1' and 'P1' input by the input operation of B3-2, to the multi-functional device 10 in T314. Here, the printing condition in the VJ command of T314 is the same as the printing condition in the VJ command of T304.

In a case where the VJ command of T314 is received from the terminal apparatus 60 (YES in S110 of FIG. 3), the multi-functional device 10 determines that the VJ command includes the user identification information 'U1' and 'P1' (YES in S120, NO in S130, YES in S140, YES in S150), determines that a combination of 'U1' and 'P1' has been registered in the function limiting table 40 (YES in S160), and determines 'the user ID 'U1'=printing OK' (YES in S170). For this reason, the multi-functional device 10 determines that the printing condition in the VJ command of T314 is appropriate for the multi-functional device 10 (S180), and transmits the 200OK to the terminal apparatus 60 in T316 (S182).

The processing of T318 to T328 that is to be subsequently executed is the same as the processing of T108 to T118 of the case Y1 of FIG. 5. However, the CJ command of T318 and the SD command of T324 further include the user identification information 'U1' and 'P1', which is the same as the user identification information in the VJ command of T314, respectively. In a case where the CJ command of T318 or the SD command of T324 is received from the terminal apparatus 60 (YES in S110 of FIG. 3), the multi-functional device 10 determines the 'user ID 'U1'=printing OK' (YES in S120, NO in S130, YES in S140, YES in S150, YES in S160, YES in S170), and determines the processing in accordance with the IPP command (S180). In this way, in the case of the 'general use=printing OK', the multi-functional device 10 can appropriately execute the printing function in accordance with the IPP command.

(Cases Y4, Y5; FIG. 7)

In the case Y4 of FIG. 7, the function limiting flag 38 of the multi-functional device 10 indicates 'ON', the 'general user=printing NG', the 'user ID 'U1'=printing NG', and the 'user ID 'U1'=printing OK'. B4-1, B4-2 and T404 to T414 are the same as B3-1, B3-2 and T304 to T314 of the case Y3 of FIG. 6.

In a case where the VJ command of T414 is received from the terminal apparatus 60 (YES in S110 of FIG. 3), the multi-functional device 10 determines the 'user ID 'U1'=printing NG' (YES in S120, NO in S130, YES in S140, YES in S150, YES in S160, NO in S170). For this reason, the multi-functional device 10 transmits a 403 command to the terminal apparatus 60 in T416 (S192).

In a case where the 403 command is received from the multi-functional device 10, the terminal apparatus 60 displays a printing disapproval screen, which displays that the user is not permitted to use the printing function, in T410. Thereby, the user can know that it is not permitted to use the printing function.

Here, it is assumed that the multi-functional device 10 adopts a configuration of transmitting the 401 command, instead of the 403 command, to the terminal apparatus 60 in T416 in a case where it is determined that the' user ID 'U1'32 'printing NG'. In this case, the authentication screen is again displayed (T408) and the input operation is again executed (B4-2) at the terminal apparatus 60. However, even when the multi-functional device 10 again receives the VJ command including the user identification information 'U1' and 'P1', the multi-functional device 10 again determines the 'user ID 'U1'=printing NG', and does not execute the printing function. Therefore, the user is again caused to execute the input operation, even though the user of the terminal apparatus 60 is not permitted to use the printing function. In contrast, in this illustrative embodiment, in a case where it is determined that the 'user ID 'U1'=printing NG', the multi-functional device 10 transmits the 403 command, instead of the 401 command, to the terminal apparatus 60 (T416). For this reason, the authentication screen is not again displayed and the printing disapproval screen is displayed at the terminal apparatus 60 (T410). As a result, it is not necessary to cause the user, who is not permitted to use the printing function, to again execute the input operation.

In a case where the VJ command of T414 includes not the user identification information 'U1' and 'P1' registered in the function limiting table 40 but the user identification information not registered in the function limiting table 40, the multi-functional device 10 again transmits the 401 command to the terminal apparatus 60 (YES in S120, NO in S130, YES in S140, YES in S150, NO in S160, S190). Therefore, for example, even when the user inputs the incorrect user identification information in the input operation of B4-2, the user can enable the multi-functional device 10 to execute the printing function by inputting the correct user identification information.

In the case Y5 of FIG. 7, the function limiting flag 38 of the multi-functional device 10 indicates 'ON', the 'general user=printing NG', the 'user ID 'U1'=printing NG', and the 'user ID 'U2'=printing NG'. That is, the print permission information is 'NG' for all the individual user information in the function limiting table 40. B5-1 and T504 are the same as B3-1 and T304 in the case Y3 of FIG. 6.

In a case where the VJ command of T504 is received from the terminal apparatus 60 (YES in S110 of FIG. 3), the multi-functional device 10 determines that OK individual user information does not exist in the function limiting table 40 (YES in S120, NO in S130, NO in S140). For this reason, the multi-functional device 10 transmits the 403 command to the terminal apparatus 60 in T416 (S192). The processing of T510 is the same as the processing of T410 in the case Y4.

As described above, in a case where it is determined that the OK individual user information does not exist in the function limiting table 40, the multi-functional device 10 transmits the 403 command, instead of the 401 command, to the terminal apparatus 60 (T506). For this reason, the authentication screen is not again displayed and the printing disapproval screen is displayed at the terminal apparatus 60 (T510). As a result, under a situation where every user is not permitted to use the printing function, it is not necessary to cause the user to again execute the input operation.

(Effects of this Illustrative Embodiment)

In this illustrative embodiment, both the individual user information for limiting the function in accordance with the PJL command and the individual user information for limiting the function in accordance with the IPP command are registered in the function limiting table 40. That is, the multi-functional device 10 does not have to store therein a table for limiting the function in accordance with the IPP command, in addition to the function limiting table 40 for limiting the function in accordance with the PJL command. For this reason, it is possible to reduce an amount of the information to be stored in the memory 34 of the multi-functional device 10. Also, since the multi-functional device 10 uses the common function limiting table 40, it is possible to appropriately manage the function limit of each user with respect to each function.

The multi-functional device 10 limits the function in accordance with the IPP command by using the same table as the function limiting table 40 for limiting the function in accordance with the PJL command Therefore, a configuration (hereinafter, referred to as 'configuration of a comparative example'), in which the same processing (i.e., the same processing as the PJL command monitoring processing of FIG. 2) as the processing executed when the PJL command is received is executed in a case where the multi-functional device 10 receives the IPP command, is conceivable. In the configuration of the comparative example, for example, in a case where the multi-functional device 10 determines that the function limiting flag 38 indicates 'ON' (equivalent to a determination result YES in S20 of FIG. 2), determines the "general user=printing NG" (equivalent to a determination result NO in S30), and determines that the IPP command does not include the user identification information (equivalent to a determination result NO in S40), the multi-functional device 10 is caused to transmit the 403 command (equivalent to S80). However, for example, as shown in the case Y3 of FIG. 6, in a case where the terminal apparatus 60 enables the multi-functional device 10 to execute the printing function by using IPP, the first time VJ command (T304) does not include the user identification information. Therefore, when the configuration of the comparative example is adopted, the multi-functional device 10 transmits the 403 command in accordance with the first time VJ command. As a result, the user cannot cause the multi-functional device 10 to execute the printing function, even though 'the user ID 'U'=printing OK'.

In contrast, according to this illustrative embodiment, in a case where the multi-functional device 10 determines that the function limiting flag 38 indicates 'ON' (YES I S120 of FIG. 3), determines the 'general user=printing NG (NO in S130)', and determines that the IPP command does not include the user identification information (YES in S140, NO in S150), the multi-functional device 10 transmits the 401 command for requesting the terminal apparatus 60 to transmit the user identification information, not the 403 command (S190, T306 of FIG. 6). For this reason, the multi-functional device 10 can receive the second time VJ command including the user identification information 'U1' and 'P1' from the terminal apparatus 60 (T314), so that it is possible to appropriately execute the printing function (T316 to T328). In this way, the multi-functional device 10 can appropriately limit the function in accordance with the IPP command by using the same table as the function limiting table 40 for limiting the function in accordance with the PJL command.

(Correspondence Relation)

The terminal apparatus 50 and the terminal apparatus 60 are examples of the 'first terminal apparatus' and the 'second terminal apparatus', respectively. The printing function and the printing engine 16 are examples of the 'specific function' and the 'specific function engine', respectively. The function limiting table 40 is an example of the 'table.' The 'ON' and 'OFF' states of the function limiting flag 38 are examples of the 'first setting' and the 'second setting', respectively. The PJL command received in S10 of FIG. 2, the VJ command received in S110 of FIG. 3, the 401 command transmitted in S190 and the 403 command transmitted in S192 are examples of the 'first function execution request', the 'second function execution request', the 'relation information request' and the 'error information', respectively. The determination result NO in S120 of FIG. 3, the determination result YES in S130 and the determination result NO in S140 are examples of the 'first case', the 'second case' and the 'third case', respectively. The user identification information 'U1' and 'P1' included in the PJL command of T40 in the case X4 of FIG. 4 is an example of the 'first individual identification information' (also, the 'first individual relation information'). The user identification information 'U1' and 'P1' included in the VJ command of T314 in the case Y3 of FIG. 6 is an example of the 'second individual identification information' (also the 'second individual relation information').

Although the specific embodiments of the disclosure have been described in detail, the embodiments are just exemplary, not to limit the claims. The technology defined in the claims includes a variety of changes and modifications to the above specific embodiments. Modified embodiments are described hereinafter.

(Modified Embodiment 1)

In the above illustrative embodiment, it is assumed that the terminal apparatus 60, which does not have the multi-functional device driver 52, transmits the IPP command to the multi-functional device 10. However, the terminal apparatus 50 having the multi-functional device driver 52 may transmit the IPP command to the multi-functional device 10. That is, the 'second terminal apparatus' may be a terminal apparatus different from the 'first terminal apparatus', like the above illustrative embodiment, or may be the same terminal apparatus as the 'first terminal apparatus', like this modified embodiment.

(Modified Embodiment 2)

In the above illustrative embodiment, the PJL command or the IPP command includes the user identification information input by the input operation, as it is. Instead of this configuration, the PJL command or the IPP command may include a digest value obtained by digesting (for example, hashing) the user identification information input through the input operation. The multi-functional device 10 may be configured to calculate each digest value by digesting the respective user identification information included in the respective individual user information of the function limiting table 40 and to execute the processing of S50 and S60 in FIG. 2 and the processing of S160 and S170 of FIG. 3 by comparing the respective calculated digest values and digest values in the PJL command or the IPP command. In this modified embodiment, the digest values in the PJL command or the IPP command are examples of the 'first individual relation information' and the 'second individual relation information.'

(Modified Embodiment 3)

The function limiting table 40 may not be stored in the memory 34 of the multi-functional device 10. For example, the function limiting table 40 may be stored in a memory of a server connected to the LAN 4 to which the multi-functional device 10 belongs, or a memory of a server on the Internet. When executing the processing of S50 in FIG. 2, the multi-functional device 10 may transmit the user identification information in the PJL command to the server and inquire the server whether the user identification information has been registered in the function limiting table 40. Also, when executing the processing of S60 in FIG. 2, the multi-functional device 10 may transmit the user identification information in the PJL command to the server and inquire the server whether the print permission information corresponding to the user identification information indicates 'OK.' This is also the same for the processing of S160 and S170 of FIG. 3. In this modified embodiment, a system including the multi-functional device 10 and the memory in the server is an example of the 'multi-functional device.'

(Modified Embodiment 4)

In S192 of FIG. 3, the multi-functional device 10 may transmit the 401 command, instead of the 403 command. In this modified embodiment, the 'transmitting of the error information' may be omitted.

(Modified Embodiment 5)

The multi-functional device 10 may repeatedly execute the processing of S190 in FIG. 3 by a predetermined number of times when a plurality of IPP commands is sequentially received from the same terminal apparatus. Then, in a case where it is determined NO in S150 or NO in S160 in response to receiving the IPP command again from the terminal apparatus, the multi-functional device 10 may execute the processing of S192 without executing the processing of S190. According to this configuration, in a case where the authentication for the user identification information fails successionally (NO in S160), for example, the multi-functional device 10 may stop the processing in which the terminal apparatus displays the authentication screen and re-transmits the IPP command to the multi-functional device 10.

(Modified Embodiment 6)

The multi-functional device 10 may not have the function limiting flag 38, and may not execute the processing of S20 of FIG. 2 and S120 of FIG. 3. That is, the 'multi-functional device' may be configured not to use the 'first setting' and the 'second setting.'

(Modified Embodiment 7)

The multi-functional device 10 may execute the function limit of the scan function in accordance with the processing of S20 to S80 in FIG. 2, in a case where a scan execution command conforming to the multi-functional device driver 52 is received. In this case, the scan permission information in the function limiting table 40 is used in S30 and S60, and the scan processing is executed in S70. Also, in a case where a scan execution command not conforming to the multi-functional device driver 52 is received, the multi-functional device 10 may execute the function limit of the scan function in accordance with the processing of S100 to S192 in FIG. 3. In this case, a command relating to the Capability information of the scan function is received in S100, and the Capability information of the scan function is transmitted in S102. Also, the scan permission information in the function limiting table 40 is used in S130, S140 and S170, and the scan processing is executed in S80. In this modified embodiment, the scan function and the scan engine 18 are examples of the 'specific function' and the 'specific function engine', respectively.

(Modified Embodiment 8)

In the above illustrative embodiment, the CPU 32 of the multi-functional device 10 executes the processing in response to the program 36, so that the respective processing of FIGS. 2 to 7 is implemented. Instead of this configuration, at least one of the respective processing may be implemented by a hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and accomplishment of one purpose has the technical usefulness.

What is claimed is:

1. A multi-functional device configured to execute a plurality of functions, the multi-functional device comprising:
    a specific function engine configured to execute a specific function of the plurality of functions;
    a processor; and
    a memory configured to store therein a table, which includes a plurality of user information including one or more individual user information and one general user information, and instructions, wherein each individual user information is information in which individual identification information for identifying an individual user and individual permission information indicating whether the individual user is permitted to use each of the plurality of functions are associated with each other, wherein the general user information includes general permission information indicating whether each user who is different from the individual user is permitted to use each of the plurality of functions, and wherein the instructions, when executed by the processor, cause the multi-functional device to perform:
        receiving a first function execution request from a first terminal apparatus, in a case where the first terminal apparatus having a driver program for the multi-functional device transmits the first function execution request for requesting the multi-functional device to execute the specific function to the multi-functional device by using the driver program;
        controlling the specific function engine to execute the specific function, in a case where the first function execution request including first individual relation information relating to first individual identification information is received from the first terminal apparatus and on condition that first individual permission information associated with the first individual identification information in the table indicates that use of the specific function is permitted;
        controlling the specific function engine to execute the specific function, in a case where the first function execution request not including the individual relation information relating to the individual identification information is received from the first terminal apparatus and on condition that the general permission information in the table indicates that use of the specific function is permitted;
        receiving a second function execution request from a second terminal apparatus, in a case where the second terminal apparatus transmits the second function execution request for requesting the multi-functional device to execute the specific function to the multi-functional device without using the driver program, wherein the second apparatus is the same as or different from the first terminal apparatus;
        transmitting a relation information request for requesting transmission of user relation information to the second terminal apparatus, in a case where the second function execution request not including the individual relation information relating to the individual identification information is received from the second terminal apparatus; and
        controlling the specific function engine to execute the specific function, in a case where the second function execution request including second individual relation information relating to second individual identification information is received from the second terminal apparatus in response to the transmitting of the relation information request to the second terminal apparatus and on condition that second individual permission information associated with the second individual identification information in the table indicates that use of the specific function is permitted.

2. The multi-functional device according to claim 1, wherein the instructions stored in the memory, when executed by the processor, cause the multi-functional device to further perform:
    controlling the specific function engine to execute the specific function, in a case where the first function execution request including the first individual relation information is received from the first terminal apparatus and a setting of the multi-functional device is a first setting indicating that the table is to be used and on condition that the first individual permission information indicates that the use of the specific function is permitted;
    controlling the specific function engine to execute the specific function, in a case where the first function execution request not including the individual relation information is received from the first terminal apparatus and the setting of the multi-functional device is the first setting and on condition that the general permission information indicates that the use of the specific function is permitted; and
    controlling the specific function engine to execute the specific function irrespective of contents of the table, in a case where the first function execution request is received from the first terminal apparatus and the setting of the multi-functional device is a second setting indicating that the table is not to be used.

3. The multi-functional device according to claim 1, wherein the instructions stored in the memory, when executed by the processor, cause the multi-functional device to further perform:
    transmitting the relation information request to the second terminal apparatus, in a case where the second function execution request not including the individual relation information is received from the second terminal apparatus and a setting of the multi-functional device is a first setting indicating that the table is to be used;

not transmitting the relation information request to the second terminal apparatus, in a first case where the second function execution request not including the individual relation information is received from the second terminal apparatus and the setting of the multi-functional device is a second setting indicating that the table is not to be used; and controlling the specific function engine to execute the specific function in the first case.

4. The multi-functional device according to claim 1, wherein the instructions stored in the memory, when executed by the processor, cause the multi-functional device to further perform:

transmitting the relation information request to the second terminal apparatus, in a case where the second function execution request not including the individual relation information is received from the second terminal apparatus and the general permission information in the table indicates that the use of the specific function is not permitted;

not transmitting the relation information request to the second terminal apparatus, in a second case where the second function execution request not including the individual relation information is received from the second terminal apparatus and the general permission information in the table indicates that the use of the specific function is permitted; and controlling the specific function engine to execute the specific function in the second case.

5. The multi-functional device according to claim 1, wherein the instructions stored in the memory, when executed by the processor, cause the multi-functional device to further perform:

transmitting the relation information request to the second terminal apparatus, in a case where the second function execution request not including the individual relation information is received from the second terminal apparatus and at least one individual permission information in the table indicates that the use of the specific function is permitted;

not transmitting the relation information request to the second terminal apparatus, in a third case where the second function execution request not including the individual relation information is received from the second terminal apparatus and every individual permission information in the table indicates that the use of the specific function is not permitted; and transmitting error information, which indicates that the specific function cannot be executed, to the second terminal apparatus in the third case.

6. The multi-functional device according to claim 1, wherein the instructions stored in the memory, when executed by the processor, cause the multi-functional device to further perform:

re-transmitting the relation information request to the second terminal apparatus, in a case where the second function execution request including the second individual relation information is received from the second terminal apparatus and the second individual permission information is not included in the table.

7. The multi-functional device according to claim 1, wherein the instructions stored in the memory, when executed by the processor, cause the multi-functional device to further perform:

transmitting error information, which indicates that the specific function cannot be executed, to the second terminal apparatus, in a case where the second function execution request including the second individual relation information is received from the second terminal apparatus and the second individual permission information indicates that the use of the specific function is not permitted.

8. The multi-functional device according to claim 7, wherein the second function execution request is a command conforming to an Internet Printing Protocol (IPP), wherein the relation information request is a command conforming to an Hyper Text Transfer Protocol (HTTP), and wherein the error information is a command conforming to the Internet Printing Protocol.

9. The multi-functional device according to claim 1, wherein the specific function includes a printing function.

10. A non-transitory computer readable storage medium storing a program, when executed by a processor of a multi-functional device configured to execute a plurality of functions, cause the multi-functional device to perform operations, wherein the multi-functional device includes a specific function engine configured to execute a specific function of the plurality of functions, the processor, and a memory configured to store therein a table which includes a plurality of user information including one or more individual user information and one general user information, wherein each individual user information is information in which individual identification information for identifying an individual user and individual permission information indicating whether the individual user is permitted to use each of the plurality of functions are associated with each other, and wherein the general user information includes general permission information indicating whether each user who is different from the individual user is permitted to use each of the plurality of functions, the operations comprising:

receiving a first function execution request from a first terminal apparatus, in a case where the first terminal apparatus having a driver program for the multi-functional device transmits the first function execution request for requesting the multi-functional device to execute the specific function to the multi-functional device by using the driver program;

controlling the specific function engine to execute the specific function, in a case where the first function execution request including first individual relation information relating to first individual identification information is received from the first terminal apparatus and on condition that first individual permission information associated with the first individual identification information in the table indicates that use of the specific function is permitted;

controlling the specific function engine to execute the specific function, in a case where the first function execution request not including the individual relation information relating to the individual identification information is received from the first terminal apparatus and on condition that the general permission information in the table indicates that use of the specific function is permitted;

receiving a second function execution request from a second terminal apparatus, in a case where the second terminal apparatus transmits the second function execution request for requesting the multi-functional device to execute the specific function to the multi-functional device without using the driver program, wherein the second apparatus is the same as or different from the first terminal apparatus;

transmitting a relation information request for requesting transmission of user relation information to the second terminal apparatus, in a case where the second function execution request not including the individual relation information relating to the individual identification information is received from the second terminal apparatus; and controlling the specific function engine to execute the specific function, in a case where the second function execution request including second individual relation information relating to second individual identification information is received from the second terminal apparatus in response to the transmitting of the relation information request to the second terminal apparatus and on condition that second individual permission information associated with the second individual identification information in the table indicates that use of the specific function is permitted.

\* \* \* \* \*